INVENTOR:
HANS VESTRE HUSE
BY

Feb. 28, 1956 H. V. HUSE 2,736,170
HYDRAULIC SYSTEM AND CONTROL MEANS THEREFOR
Filed Nov. 24, 1954 5 Sheets-Sheet 2

INVENTOR:
HANS VESTRE HUSE
BY

INVENTOR:
HANS VESTRE HUSE
BY

INVENTOR:
HANS VESTRE HUSE
BY

INVENTOR:
HANS VESTRE HUSE
BY

United States Patent Office 2,736,170
Patented Feb. 28, 1956

2,736,170

HYDRAULIC SYSTEM AND CONTROL MEANS THEREFOR

Hans Vestre Huse, Brattvaag, Norway, assignor to Hydraulik A/S, Brattvaag, Norway, a Norwegian company Application November 24, 1954, Serial No. 470,925

Claims priority, application Norway November 28, 1953

8 Claims. (Cl. 60—53)

This invention relates to a hydraulic transmission system for a winch particularly for use in hoisting cargo and baggage on board ships and for use as a trawl winch on board fishing boats. Further, the invention also relates to manually adjustable control means for such systems, which control means are readily adapted for use in different types of multiplex hydraulic systems.

Accordingly, the invention consists of a hydraulic transmission system for a winch, comprising a substantially constant delivering fluid pump, a hydraulic fluid circuit comprising a supply line from said pump to a manually adjustable control valve, a feed conduit from said control valve to a hydraulic motor circuit and a discharge conduit from said circuit to the control valve and a return line from said control valve to the pump, said supply line comprising a first and a second branch conduit leading from their junction to individual ports in said control valve, said first branch conduit leading to a port which is selectively connected to the feed conduit in the stop and hoisting positions of said control valve, and a check valve in the first one of said branch conduit, said check valve opening for a flow towards the feed conduit and situated at a point intermediate said junction and said port.

A further feature of the invention consists in a manually adjustable control valve comprising a hollow casing, a cylinder within said casing, a slide member axially slidable within said cylinder and carrying a plurality of flanges arranged to form closed spaces for communication between axially spaced ports in the wall of said cylinder, two ports for discharge fluid one at each end of said cylinder and a channel for communication between both of said discharge ports, two axially spaced ports for pressure supply fluid intermediate the ends of said cylinder and a channel for communication between both of said ports, a check valve in said channel, which check valve opens in the direction of the flow of supplied pressure fluid, and ports leading to and from a hydraulic motor circuit, each of which ports is situated between both of said supply ports and an individual end of said cylinder.

Further features of the invention will be apparent from the following description of two particular embodiments, given by way of example only, with reference to the accompanying drawings, wherein.

Figure 1:
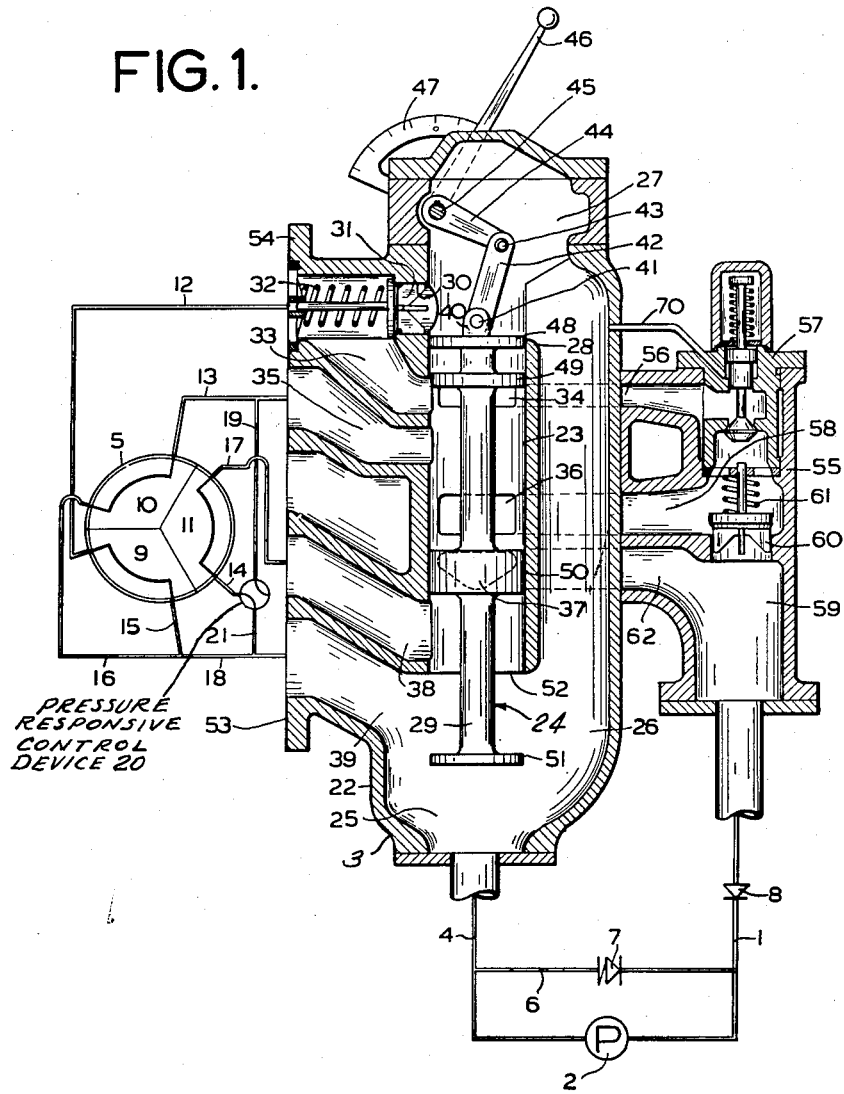
Figure 1 is a diagrammatic view of a hydraulic system according to one embodiment of the invention, with the manual control valve of this system shown in a section.

Referring to Figures 1 to 7, the hydraulic system comprises a main supply line 1 for supplying pressure fluid under varying pressures but with a constant volumetric speed from a non-reversible pump 2 to a manually adjustable control valve generally designated with the reference numeral 3. This manual control valve is adjustable for distributing the pressure fluid between a short circuit to a main return line 4 leading back to the pump or its reservoir, and different conduits leading to a hydraulic motor unit generally and diagrammatically shown at 5.

A relief line 6 closed by a relief valve 7 connects the main supply line 1 with the main return line 4. The line 6 with its valve 7 constitutes a conventional safety device against overload and breakdown in that the valve 7 opens or "blows" should the pressure exceed a certain maximum value.

A check valve 8 is arranged in the main supply line 1 between the relief line 6 and the manual control valve 3. The check valve prevents any back flow from the motor through the pump 2 or the relief line 6, should the pump stop or the safety valve "blow."

The motor unit 5 is a so-called triplex motor (i. e., a motor having three separately controlled motor chambers) having three motor circuits 9, 10 and 11, which are supplied with pressure fluid through individual feed conduits 12, 13 and 14 respectively. After passing through the motor circuits the fluid from each circuit is led back through outlets 15, 16 and 17 respectively. The conduits of the first mentioned two outlets 16 and 16 are connected to a main discharge conduit 18, while the last mentioned outlet 17 is individually connected to the manual control valve 3.

While the two first mentioned motor circuits 9, 10 are supplied with pressure fluid by their feed conduits 12, 13 being individually connected to said valve, the third motor circuit is supplied with pressure fluid from a branch conduit 19 which is branched off from the feed conduit 13 of the second motor circuit 10. This branch conduit 19 is connected to a pressure responsive control device 20 which controls the fluid supply to the third feed conduit 14 and may alternatively connect this conduit 14 to either the branch line 19 or a branch conduit 21 which is branched off from the main discharge conduit 18.

The main discharge conduit 18 as will appear later, is illustrated as being connected to the manual control valve 3, but is in reality in constant communication with the main return line 4 and is not controlled by said valve.

The feed conduits 12 and 13 and the outlet conduit 17 are, as indicated above, individually connected to the manual control valve 3 and are controlled by said valve. This manual control valve is a slide valve which may be manually adjusted to positions in which the main supply line 1 is in free or throttled communication with some of the conduits 12, 13 and 17 and/or the return line in certain combinations which are hereinafter discussed in detail.

The structural design of the manual control valve 3 is shown in Figure 1. The valve has a main housing 22 with an open ended cylinder bore 23 in which an axially slidable slide member 24 is snugly mounted. The housing 22 is at its lower end provided with a main communication chamber 25 from which the main return line 4 is conducted back to the pump. A branch channel 26 leads from the lower chamber 25 to the upper part of the cylinder bore 23 and opens into an upper chamber 27. The opening into this upper chamber is partly located in the wall of the cylinder bore 23 and is terminated downwardly by an edge 28 at the upper end of said wall.

In this respect, it should be noted that the slide member receives fluid pressure of exactly the same magnitudes against its upper and lower end faces, by the chambers 27 and 25 being in constant communication with the discharge side of the hydraulic system. As the areas of said faces are identical, the slide member is axially unaffected by pressure differentials occurring in the system. When once set in a position, it cannot be displaced axially by pressure differences due to the back pressure in the system.

The slide member 24 comprises an axial valve stem 29 carrying flanges or lands for selective disconnection of or intercommunication between several channel openings in the wall of the cylinder bore 23. Starting from above, a channel 30 is arranged for communication between the upper chamber 27 and the feed conduit 12 to the first motor circuit 9. This channel 30 is normally closed by a check valve 31 which is held towards its seat by a low loaded return spring 32. Said feed conduit 12 also communicates with a second channel 33 which is located in the cylinder bore below the first channel 30 as well as the upper edge 28. A first supply channel opening 34 opens into the cylinder bore in the same axial height as the second channel 33, whereby said opening 34 communicates freely with the channel 33 in every position of the slide member 24.

A third channel 35 is located below the second channel 33. The third channel 35 communicates with the feed conduit 13 to the second motor circuit 10. Consequently, communication between said channels 33, 35 may be prevented by means of a land or flange of the slide member, so that fluid only has access to one channel, as will be explained hereinafter.

A second supply opening 36 is located below the third channel 35 at a distance from the lower edge of the channel 35 to the upper edge of the supply opening 36 at least equalling the axial dimensions of the channel openings.

A third supply opening is located at 37 below the second supply opening 36 and is, as are the first and second supply openings 34, 36, arranged for supplying pressure fluid in some positions of the slide member 24.

It appears from Figure 1 that this latter supply opening 37 is restricted downwardly in a substantially triangular section, whereby a special effect which will be reverted to, is obtained. It may be mentioned that the opening into the upper chamber 27 from the branch channel 26 as restricted by the edge 28 is of a similar triangular, downwardly pointing section.

The discharge conduit 17 from the third motor circuit 11 communicates with a channel 38 which opens into the lower end of the cylinder bore 23 below the third supply opening 37. The main discharge conduit 18 is led into the lower chamber 25 through a channel 39 in the lower end of the housing 22 of the manual control valve 3.

The valve stem 29 of the slide member 24 is at its upper end provided with a yoke 40 with a pivot pin 41 by means of which a link 42 is linked at one end to the slide member. The opposite end of this link 42 is by means of a pivot pin 43 linked to one end of a second link 44, which is keyed at its opposite end to a shaft 45 journalled in the housing 22. One end of this shaft 45 extends outside the housing, and a handle 46 is secured to this outer end of the shaft 45. The handle is guided by a guide 47 upon which the different positions of the slide member are engraved.

By means of this handle 46 the slide member 24 may be displaced axially within the cylinder bore 23 and may be brought to different positions with different flow paths, of which some selected ones are shown in Figures 2 to 7. It will be readily apparent that the slide member 24 may be brought to any position between its extreme positions of Figure 2 and Figure 7.

For the sake of simplification, the parts 40 to 47 are substituted in Figures 2 to 7 by a rod 29a, which constitutes the manually operated means for adjusting the position of the slide member 24.

As mentioned, the slide member 24 is provided with flanges or lands integral with its stem 29. At its upper end the stem 29 carries an upper top flange 48, while a lower top flange 49 is spaced from said upper top flange by a distance corresponding to the axial dimensions of the channel openings 33, 34. When the slide member 24 is in its lowermost position, the upper top flange 48 is located just below the upper edge 28.

Figure 3:
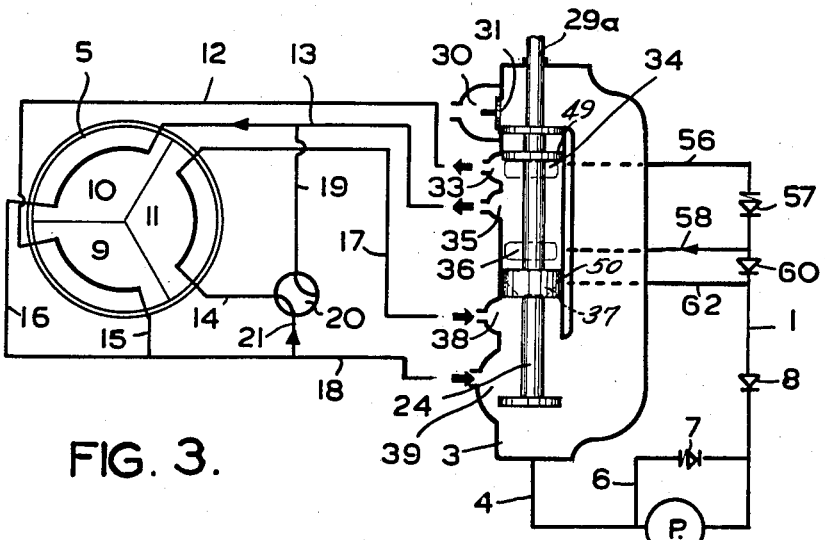

A broad intermediate closing flange 50 is spaced from the lower top flange 49 by a distance corresponding to about the distance in axial direction from the upper edge of the channel opening 33 to the upper edge of the lower supply opening 37. The intermediate closing flange 50 has such axial dimensions that the flange is able to close the lower supply opening 37 fully, as shown in Figures 1 and 3.

The stem 29 of the slide member is terminated downwardly by a lower end flange 51 which is spaced from the lower end of the intermediate closing flange 50 with a space which allows for the lower end flange 51 to be moved up to a closing position completely closing a seat 52 at the lower end of the cylinder bore 23, without the intermediate closing flange closing the channel 35 for upward communication or the supply openings 36, 37 for downward communication.

The flanges of the slide member are all provided with circumferential grooves forming labyrinth packings, so that the different flow paths set up by the flanges are tightly separated from each other.

These grooves, apart from their serving as a labyrinth packing, are also arranged in order to prevent the slide member from being locked by a radially directed pressure against the opposite wall of the cylinder bore outside a supply opening. Partly, the grooves give access for lubricating fluid to such opposite wall and partly the area receiving such pressure is reduced.

The channel communicating with the feed and discharge conduits of the motor unit 5 are arranged in the same radial direction in the housing 22. In actual use, the main housing 22 of the manual control valve is flanged to a motor unit by means of flanges 53 and 54, whereby the different channels 30, 33, 34 and 39 in the housing 22 are brought to communicate in desired manner with the different channels and chambers in the motor unit. Hence, the conduits 12, 13, 18 and 17 are no real conduits but only channels in a structure consisting of the housing 22 and the housing of the motor unit.

The main supply line 1 for pressure fluid from the pump is connected to an auxiliary housing 55 which is shown in the present embodiment as being integral with the main housing 22. This auxiliary housing 55 has an upper channel 56 which leads to the first supply opening 34. The upper channel 56 is closed by a special valve 57 against communication with an intermediate channel 58.

The intermediate channel 58 is arranged to supply pressure fluid from a chamber 59 which forms a continuation of the main supply line 1, to the supply opening 36, as well as to the upper channel 56, through a check valve 60 which is held towards its seat by a low loaded return spring 61. Pressure fluid must pass through this check valve 60 before access to the intermediate channel and the upper channel is obtained.

A lower channel 62 leads from the chamber 59 directly into the supply opening 37, so that pressure fluid flowing through this opening is not force to pass through the check valve 60.

In other words, the channel 62 short circuits the check valve 60 and the flow through this channel is independent of the pressure in the channels 56 and 58.

Figures 8, 9:
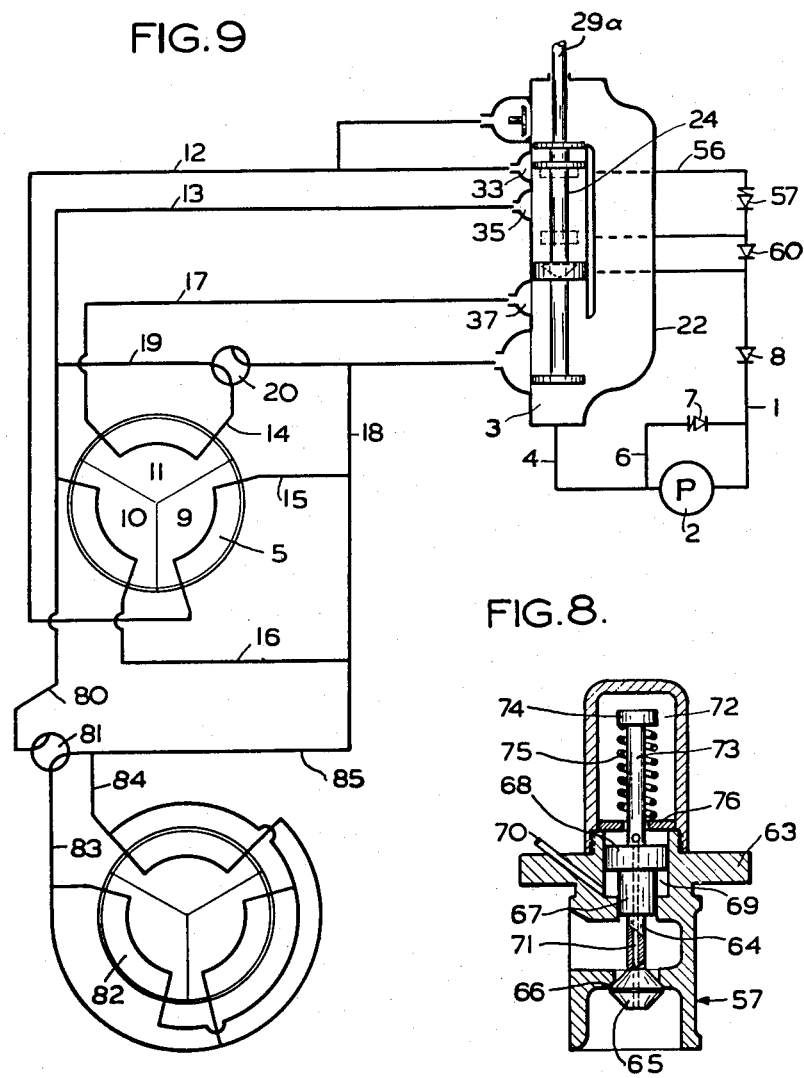
Figure 8 is a vertical section of a part in the system, drawn to a larger scale.
Figure 9 is a diagrammatic view of another embodiment of the present invention.

The valve 57 is shown in greater detail in Figure 8. The valve has a casing 63 enclosing a valve stem 64 which at its lower end has a valve head 65 which is seated for downward movement during opening against a seat 66. The valve stem carries at its upper end a piston 67 which is terminated by a wider piston flange 68. Thus, the flange 68 defines an oil chamber 69 which by means of a pipe 70 is filled with discharge fluid from the branch channel 26, which as mentioned above contains fluid from the main discharge.

The valve stem 64 has an axial bore 71 which extends from the valve head 65 in communication with the intermediate channel 58 and up to the upper end face of the piston flange 69 in communication with a chamber 72 above said flange. The valve stem is extended upwardly into said chamber with an extenison 73 and terminates in an end flange 74 which receives the upper end of a control spring 75, the lower end of which is engaged by a disc 76. This control spring is relatively highly loaded, and its load may be regulated by the flange 74 being threaded upon the upper end of the extension 73. This control spring acts to keep the valve head 65 pressed to a closing position against the seat 66 so that a substantial pressure is necessary to open said valve, as will be reverted to hereinafter.

The correlation between the different areas subjected to hydraulic fluid in the valve 57 is arranged such as to obtain a certain desired opening characteristic of the valve 57 all according to the status of the hydraulic system as a whole. Thus, the valve 57 is arranged to open and remain open if a given pressure differential is exceeded in one occasion, and to open for another pressure differential in another occasion. This is obtained by arranging three areas against which the supply fluid may act.

Thus, the supply pressure is applied from above against the area of the upper end face of the piston shoulder of flange 8 in all events, as pressure fluid has free access to the upper chamber 72 through the axial passage 71 of the valve stem 64 from the channel 58 even when the valve 57 is closed. The downward force acting in the valve is thus the pressure differential in the system, multiplied by the area of said piston flange 68.

Upwardly, the force from the control spring 75 also is applied under all circumstances.

In addition thereto, the pressure differential multiplied by the area of the valve head 65 acts upwardly, if the valve 57 is closed and the channel 56 is filled with discharge fluid.

If the valve 57 is open, or if the channel 56 is filled with pressure fluid, the supply pressure against the head 65 is released, and the supply pressure instead acts against the lower end face of the piston 67.

As shown in Figure 8 the valve head 65 has a greater area than the piston 67, while the piston flange 68 has a greater area than the valve head 65.

In addition, a dynamic pressure may occur against the valve head 65 due to a flow of fluid into the channel 56 when the valve is open.

The pressure differentials resulting from the areas having different magnitudes will therefore cause the valve to open at a lower pressure if pressure fluid has admittance to the channel 56, than if said channel is filled with discharge fluid. The reasons for this special feature of the valve 57 will be reverted to later.

Finally, the pressure responsive control device 20 should be mentioned. This device is in reality a pressure responsive three-way valve which connects a conduit, that is the feed conduit 14, with one conduit, i. e. the branch 21, when the pressure is below a certain value, and with another conduit, i. e. the branch conduit 19, when the pressure is above said certain value. Such devices are known in the art.

An explanation of the system disclosed in Figures 1 to 8 will now be given. It should be noted, however, that the positions shown in Figures 2 to 7 are only representative positions, and that the slide member may be adjusted infinitely to intermediate positions theretbeween.

Figure 2:
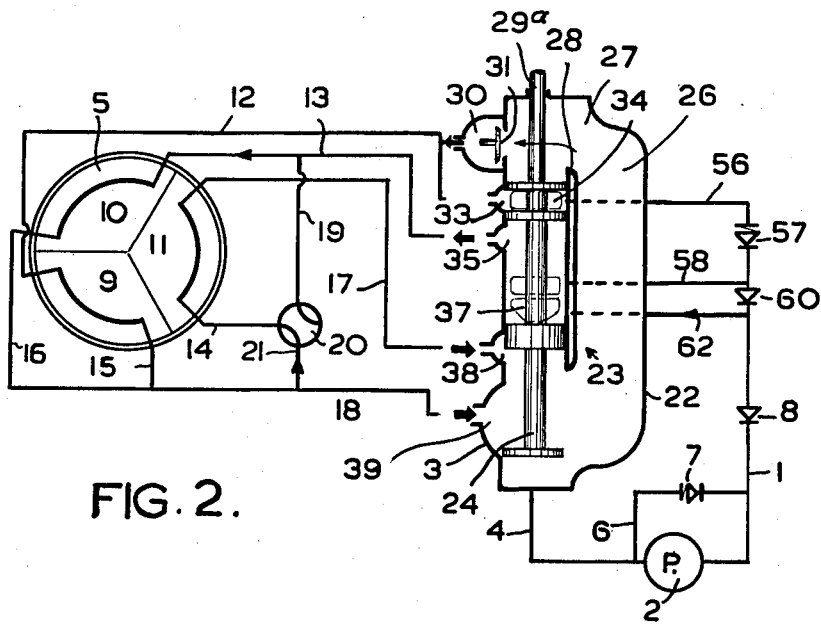
Figures 2 to 7 are diagrammatic views of the system according to the embodiment of Figure 1, showing different positions of the manual control valve with the parts of said valve shown in simplified form.

The position of full hoisting speed is shown in Figure 2. In this position the pressure fluid flows through the main supply line 1, through the direct channel 62 and the opening 37 into the cylinder 23. From here on the fluid only communicates with the channel 35 and the feed conduit 13 to the motor circuit 10. The lower top flange 49 disconnects the channel 33 and the opening 34 from the compartment to which the pressure fluid has access through the openings 36 and 37.

The circuit 10 receives the entire amount of pressure fluid supplied from the pump, and is driven at a speed equalling the supplied amount per unit of time, divided by the cross section of the flow chamber in the motor circuit 10. The discharge is led back to the return line 4 through the discharge conduit 18.

The two other motor circuits 9 and 11 do not receive any pressure fluid supply, and must be short circuited lest they block the motor unit 5. The motor circuit 9 is short circuited through the channel 30, because the check valve 31 opens and allows a flow of fluid from the upper chamber 27. The motor circuit 9 is driven as a pump and generates a suction in the channel 30 to open said valve 31.

The motor circuit 11 is supplied with fluid from the discharge conduit 18 via the branch conduit 21 through the device 20, which is assumed to be in a position short circuiting the motor circuit 11, as indicated by the symbol. Discharge fluid is thus supplied to the feed conduit 14 of said motor circuit, and the discharge from this circuit is by means of the discharge conduit 17 and the channel 38 connected to the return line 4.

Provided that the load is relatively low, that is lower than the maximum load allowed for one motor circuit, in other words lower than one third of maximum load, this position gives the maximum hoisting speed obtainable and twice the speed of the next position now to be described.

The channel 58 is in full communication with the pressure fluid, so that the supply pressure acts against the lower face of the valve head 64 in the valve 57.

The parts 40—47 are preferably arranged so that the position shown in Figure 2 represents the lowermost position of the slide member 24. By moving the handle 46 in an anticlockwise direction, the position shown in Figure 3 (which is the same position as shown in Figure 1) is obtained. In this position, the supply opening 37 is fully closed by the intermediate closing flange 50. The fluid is forced to flow through the check valve 60 into the channel 59 and through the intermediate supply opening 36 into the cylinder 23. The fluid has access to both channels 35, 33, because the lower top flange 49 no longer disconnects the channel 33 from the middle part of the cylinder.

Because the channel 30 is filled with pressure fluid, the check valve 31 closes the prior communication between this channel and the upper chamber 27.

The fluid flow is divided into two equal branches, one to each of the motor circuits 9 and 10, consequently, the hoisting speed is lowered to one half of the hoisting speed obtained in the position shown in Figure 2, when all the supplied amount was supplied to a single motor circuit. The discharge flows through the main discharge conduit 18. A certain part of the discharge flows through the third motor circuit 11 through the device 20. As above, this device is drawn in its short circuiting position.

Figure 4:
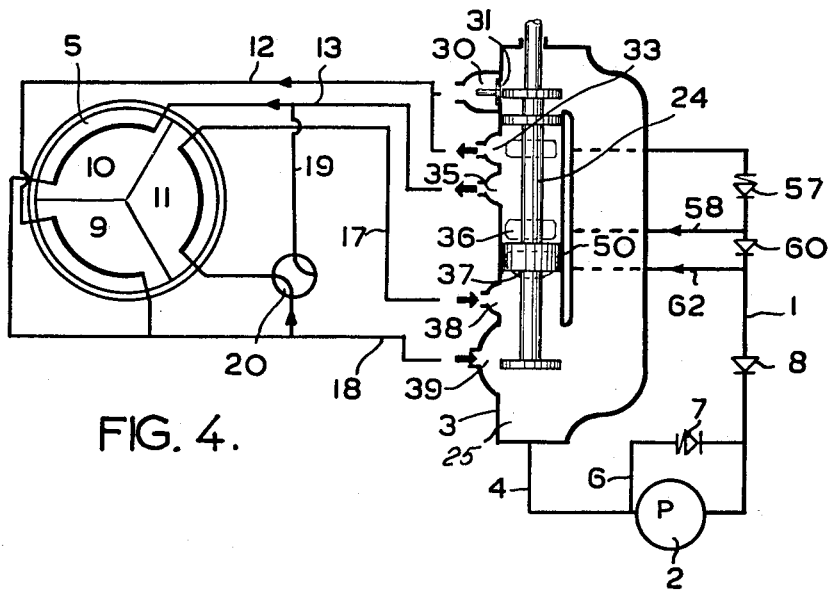

If the handle 46 is moved further to the left in Figure 1, the position shown in Figure 4 is obtained. In this position the closing flange 50 is moved so far upwardly that the supply opening 37 is opened for communication downwardly with the lower chamber 25. A certain part of said opening is choked by the closing flange.

According to the pressure differential between the discharge side and the pressure side of the system, a certain part of the fluid supplied from the pump is conducted through this opening 37 directly to the return line 4. The remaining part flows through the check valve 60 and the opening 36 and is distributed in equal parts to the channels 33 and 35, the conduits 12 and 13, and hence rotate the motor unit 5.

The pressure differential depends upon the back pressure due to the load. In other words, no hard and rigid rules may be given for the speed at a given positive choke opening of the channel 62 into the discharge, but this speed will vary. However, below a given load, a predetermined and fixed speed is always reached in the position shown in Figure 3.

It may well be that the back pressure from the load is higher than the pressure differential necessary to conduct all pressure fluid supplied through the opening 37; in that event no fluid can pass through the check valve, so that the load is kept at rest.

This action of the check valve 60 will be reverted to.

In order to obtain a relatively long angular movement for the handle 46 before such opening allowing all fluid to pass directly to the return line is reached, even at high loads, the opening 37 is restricted downwardly to a substantially triangular section, with the point pointing downwardly. Even at high pressures the closing flange must travel a substantial axial distance before all pressure fluid can pass the opening 37.

As soon as the position wherein all fluid passes the opening 37 directly to the return line 4 is reached, the motor unit 5 receives no fluid, and is consequently stopped. From this point on and to the next position, a stop area is present upon the guide 47 but, as mentioned above, the stopping point varies with the load, so that only the position of Figure 5 is engraved upon the guide as being the zero position of the winch.

Figure 5:
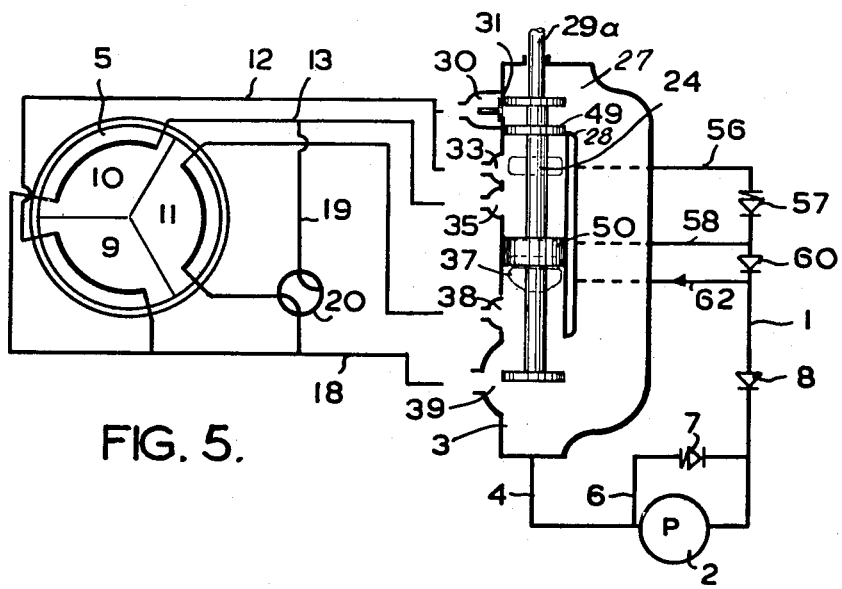
Figure 6:
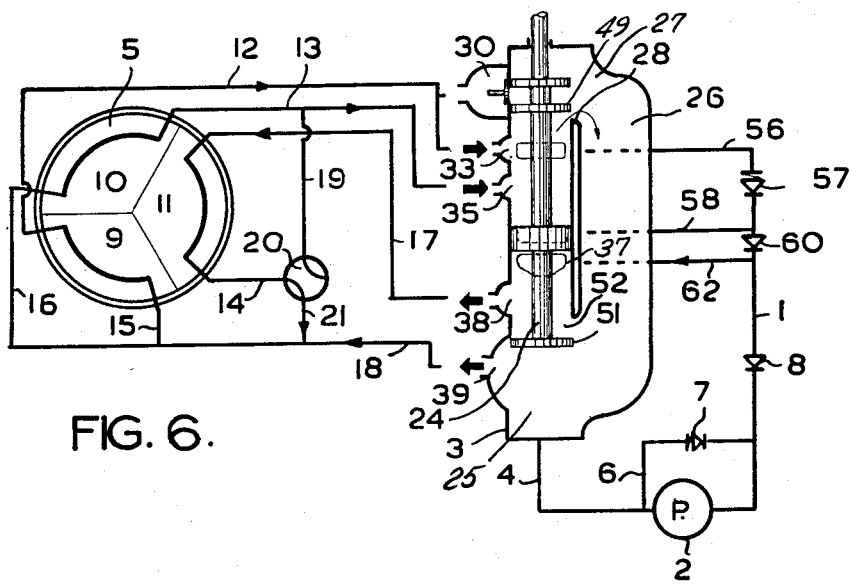

In this position shown in Figure 5 the closing flange 50 is brought to a position in which the flange blocks the opening 36. The lower opening 37 is opened fully, and the fluid flows freely and unchoked through the channel 62 through this opening 37 to the return line 4.

As the resistance in the circuit through the channel 62 direct to the return line 4 is the position for the hydraulic system at rest, the channels and openings are preferably constructed so that no throttling or substantial resistance occurs in this circuit. It should be noted, therefore, that the winch, even with an empty hook, stops moving before the zero position is reached. Thus, it is not the blocking of the opening 36 which should be regarded as the essential feature of the zero position, but the lowering of the flow resistance through the channel 62 to being lower than the resistance through the hydraulic motor unit 5.

The arrangement in the present embodiment of the opening 36 as being blocked in the zero position is consequently only a preferred one. This preferred embodiment results in the motor unit 5 being blocked in the zero position against rotation in forward as well as backward directions.

In connection herewith, the mode of action of the different check valves in the present system should be mentioned.

The channel 30 is arranged in order to enable disconnection of the feed conduit 12 without it being necessary to connect said feed conduit 12 to the discharge. The channel 30 is in reality a permanent connection with the discharge, and the valve 31 enables, in spite of such permanent connection, pressure fluid to be supplied to this channel 30 without short circuiting.

This channel 30 with its associated valve 31 may be placed elsewhere in the system, for instance between the conduits 12 and 15.

The check valve 60 is a basic valve in the present system. Primarily, this valve is arranged in order to prevent the motor circuit being driven in opposite directions by the load being lowered, when the handle is moved from the zero position shown in Figure 5 and to hoisting position shown in Figure 3. As the fluid in the zero position is circulated with almost no pressure, any free opening between the supply line and the feed conduits would have allowed the fluid within the motor to be forced through the opening 36, through the seat of the valve 60 and then through the opening 37 to the discharge. Therefore, the valve 60 allows decrease of the pressure in the short circuit to almost zero at any loads on the hook while simultaneously ensuring that no positions of the handle to the right in Figure 1 are lowering positions.

The location of this valve in an auxiliary housing has many advantages in relation to prior known control valves in which a check valve having the same function as the present valve 60 has been arranged as an operative part of the slide member.

It should be noted that the valve 8 also cooperates with the check valve 60 for the correct working of the system. As mentioned, this valve is arranged to prevent the winch barrel from being turned in the reversal direction should the pump stop or the safety valve open. A usual relief valve is in most cases kept open at lower pressures than the opening pressure after opening because of the dynamic pressure exerted upon the valve member.

The valve 60 prevents such backward flow in the positions shown in Figures 3, 4 and 5, but not in the position shown in Figure 2, if the valve 57 is open. The valve 8 is therefore necessary in this position shown in Figure 2.

In the position shown in Figure 5, the lower top flange 49 has been moved so far upwardly that this flange is aligned with the lower edge 28 of the opening into the upper channel 27. If the slide member 24 is moved somewhat further upwardly, the interior of the cylinder 23 and hence the feed conduits 12, 13 may be brought to communicate with the discharge with a certain choke.

As mentioned, the load exerts a back pressure of a considerable magnitude in the motor unit, so that the load may drive the motor circuits as a pump in the opposite direction. This is just what happens in the position of Figure 6. The fluid can flow from the motor circuits 9 and 10 through the conduits 12 and 13, and pass the opening between the edge 28 and the lower top flange 49 and into the upper chamber 27. Through the channel 26, the lower chamber 25, the channel 39 and the discharge conduit 18, the flow continues to the motor circuits 9 and 10. The lower flange 51 of the slide member does not choke the short circuit in the pump circuit through the opening 37 in this position.

Because this position is quite important, especially when hoisting higher loads, the edge 28 also restricts its opening with a triangular section, so that the lower top flange must travel a considerable axial distance before this opening is fully opened.

It will be apparent that the lowering may proceed at any speed and that the operator may easily control the downward travel of the load.

Figure 7:
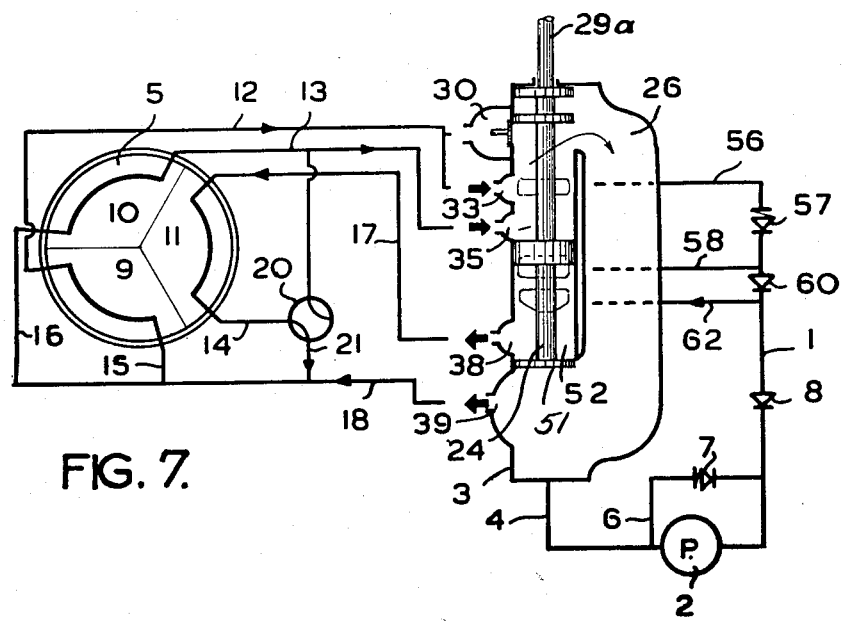

If the slide member is moved farther upwardly, the lower end flange 51 chokes and finally closes the opening 52 of the cylinder to the lower chamber 25. The position is shown in Figure 7, and represents full reversal of the hydraulic system. The fluid is forced into the channel 38 and has access to the third motor circuit 11.

The speed equals the speed obtained in the position shown in Figure 2. It should be unnecessary to point out that the remaining circuits are in free communication with the discharge, so that they are short circuited in this position.

The mode of operation of the device 20 and the valve 57 is described in the specifications of our copending applications Nos. 470,863 and 470,923 and has not therefore been described above. However, it seems to be necessary to discuss in greater detail the mode of operation of the valve 57 when hoisting loads in the middle load range.

Some hydraulic duplex systems are known in the art, in which the safety valve "blows" if the manual control means are adjusted to forcing the pressure fluid from the pump through a single motor circuit (Figure 2 in the present system) and the load is in the middle range. The manual control means must then be readjusted to a position wherein the second motor circuit also receives pressure fluid. If the pressure in the system then drops to a value below the maximum value, the load is hoisted.

In the present system the possibility of adjusting the manual control means to a position wherein all fluid is supplied to a single circuit is prevented automatically as soon as the load exceeds a certain value. This "foolproof" prevention is obtained by means of a flow line short circuiting the means for disconnecting one circuit in order to obtain an additional speed range. As said disconnecting means in the present system is the slide member 24, the flow line in reality short circuits this slide member.

Said special flow line is the channel 56 with its associated valve 57. In reality, this channel might as well have been connected to the feed conduit 12 directly, and should be regarded as a circuit line leading directly from the main supply line 1 direct into the feed conduit 12. Normally, this flow line is closed by the valve 57, but may be opened as follows:

If the slide member is positioned in the position shown in Figure 5 and is moved downwardly, the throttling of the opening 37 causes the pressure to increase until the pressure is sufficient to hoist the load. This occurs as soon as the back pressure resulting from the load against the vanes in the motor is exceeded. As soon as the position of Figure 3 is reached, no fluid can pass the fully blocked opening 37 and is forced to pass through the two motor circuits 9 and 10 opposing the back pressure.

It will be readily understood that the fluid also has access to the interior of the channel 56 through the opening 34 in this position, although no actual flow occurs through said channel in this position. Consequently, the head 64 of the valve 57 receives the pressure from the supplied fluid from all sides, and it is the pressure fluid acting against the area of the lower end face of the piston 67, which in addition to the spring force counteracts the downward force resulting from the pressure fluid within the chamber 72.

Therefore, the valve 57 opens in the position shown in Figures 1 and 3 if the pressure exceeds a certain value. Consequently, if the operator now tries to obtain an additional speed range by adjusting the slide member to the position shown in Figure 2, no additional speed is obtained, because the open valve 57 allows fluid to flow through the channel 56, through the opening 34 and into the channel 33, unrestricted by any adjustment of the slide member 24 to the position shown in Figure 2. In other words, the disconnectable motor circuit 9 is supplied with pressure fluid also in the position shown in Figure 2, if the pressure exceeds a certain value.

Preferably, this value is chosen so as to prevent the system from being subjected to overload if only one circuit is connected to the main supply. In the present embodiment, the opening pressure of the valve 57 with pressure fluid acting against the lower end face of the piston 67 is preferably chosen to about one half of the maximum pressure which is desired to supply to only one motor circuit.

This is because the motor circuits 9 and 10 are of equal capacities, and it should be obvious to one skilled in the art to provide for other opening characteristics in the case of other capacities for said circuits.

However, if the load is too small to open the valve 57 when two motor circuits are connected, the pressure will rise above the opening pressure for such valve in the position shown in Figure 3, if the load exceeds more than one half of the load set as the maximum load for a single circuit. The opening characteristics of the valve 57 in that event are as follows:

As soon as the slide member 24 is moved to the position shown in Figure 2, the area receiving the supply pressure from below in the valve 57 is shifted over to the valve head 64. As above mentioned, this area is greater than the area of the lower end face of the piston 67, so that a greater upward force upon the valve 57 results. Provided that this area differential is sufficiently great, the valve will not open in the position shown in Figure 2 either.

If the above considerations only were to be taken into account, the area of the valve head could have been chosen quite freely. But another point must be taken into consideration.

If the operator has lowered the winch hook to an extreme position and has to hoist a load exceeding the maximum load for a single circuit, he may move the handle past the position of Figure 3 and to the position of Figure 2 without tightening the hook, so that the full tightening first is obtained in the position shown in Figure 2.

Hence, the position shown in Figures 1 and 3 is passed with a load corresponding to empty hook, whereupon the back pressure from the load is applied fully to the system.

To compensate also for this possibility, the valve 57 is preferably arranged so that the difference between the area of the piston shoulder 68 and the area of the valve head 64 is about half the difference between the area of the piston flange or shoulder 68 and the area of the piston 67, whereby the valve 57 opens for a pressure in the position of Figure 2 about the double opening pressure shown in Figures 1 and 3. In practice therefore, the valve 57 opens for substantially the same load in said two positions.

Another feature should also be mentioned in this connection:

If the valve opens in the position shown in Figure 2, the pressure drops due to the reconnection of the motor circuit 9. It is of course not desirable that the valve then closes again, due to said drop in pressure. The valve 57 is therefore so arranged that the valve is kept open due to the channel 56 being filled with pressure fluid of pressure higher than half the maximum pressure which is desired to be used with only one motor circuit connected.

As soon as the load drops below the maximum value, the valve 57 closes again.

The embodiment hereinbefore set forth may be changed to a hydraulic duplex system by omitting the circuit 11 and the device 20. It appears also from Figure 9 that the invention may also be used in connection with a hydraulic quadruplex system.

In this figure, a fourth motor circuit is connected to the feed conduit 13 by means of a branch conduit 80 leading to a pressure responsive control device 81 controlling the supply to a motor circuit 82 by being connected to a feed conduit 83 of said circuit. A discharge conduit 84 is connected to a branch conduit 85 from the main discharge conduit 18. This latter branch conduit is also connected to the device 81 for supplying the feed conduit or inlet 83 with discharge fluid at pressures below a predetermined value.

However, these and other changes which are possible to one skilled in the art should fall within the scope of the present invention as defined in the appended claims.

What I claim is:

1. A hydraulic transmission system for a winch, comprising a substantially constant delivering fluid pump, a hydraulic fluid circuit comprising a supply line from said pump to a manually adjustable control valve, a first feed conduit from said control valve to a first motor circuit, a second feed conduit from said control valve to a second motor circuit, discharge conduits from said first and said second motor circuits to the control valve and a return line from the control valve back to the pump, said supply line from the pump comprising a first branch conduit and a second branch conduit leading from their junctions to individual ports in said control valve, said first branch conduit leading to a port selectively connected with said feed conduits in hoisting and stop positions of the control valve while the port of the second branch conduit is selectively connected to said return line in positions of varying speed and stop of the control valve, a check valve opening for a flow towards the motor circuits and situated at a point intermediate said junction and said port of the first branch conduit whereby the pressure in said second branch conduit may be decreased below the pressure in said first and second feed conduits.

2. A hydraulic transmission system according to claim 1, wherein said first motor circuit is disconnectable by the control valve for selective supply of pressure fluid to the second motor circuit, a branch leading from said supply line to the first feed conduit, a pressure responsive valve in said branch.

3. A hydraulic transmission system according to claim 2, wherein said branch leads from a point in said first branch conduit located between the check valve and the port of said branch conduit.

4. A hydraulic transmission system according to claim 3, wherein a channel is arranged which allows discharge fluid into said first motor circuit in its disconnected position, a check valve being arranged in said channel preventing a fluid flow from said channel to the discharge.

5. A manually adjustable control valve for a hydraulic transmission system, comprising a hollow casing, a cylinder within said casing, a slide member axially slidable within said cylinder and carrying a plurality of flanges arranged to form closed spaces for communication between axially spaced ports in the wall of said cylinder, two ports for discharge fluid one at each end of said cylinder and a channel for communication between both of said discharge ports, two axially spaced ports for pressure supply fluid intermediate the ends of said cylinder and a channel for communication between both of said ports, a check valve in said channel which check valve opens in the direction of the flow of the supplied pressure fluid, ports leading to and from a hydraulic motor circuit each of which ports are situated between both of said supply ports and an individual end of said cylinder.

6. A control valve according to claim 5, wherein said slide member has a closing flange arranged to close a first one of said ports for supply fluid while the second port remains open for communication with a port leading to said hydraulic motor circuit.

7. A control valve according to claim 6 wherein said check valve is arranged for trapping a fluid flow from said second port to said first port.

8. A control valve according to claim 6 wherein said closing flange is arranged to close said second port while allowing communication between said first port and a discharge port.

References Cited in the file of this patent

UNITED STATES PATENTS

| | | |
|---|---|---|
| 1,775,856 | Hauser | Sept. 16, 1930 |
| 2,618,291 | Vestre | Nov. 18, 1952 |
| 2,655,000 | Vestre | Oct. 13, 1953 |